F. E. STRATTON

Aug. 11, 1931. FLUID PRESSURE ACTUATED GRINDING MACHINE

Re. 18,149

Original Filed Feb. 17, 1926 5 Sheets-Sheet 1

Inventor
Frank E. Stratton
By Thomas A. Jenckes Jr.
Attorney

F. E. STRATTON

Aug. 11, 1931. FLUID PRESSURE ACTUATED GRINDING MACHINE Re. 18,149

Original Filed Feb. 17, 1926 5 Sheets-Sheet 2

Inventor
Frank E. Stratton
By
Thomas A. Jenckes Jr.
Attorney

F. E. STRATTON

Aug. 11, 1931. FLUID PRESSURE ACTUATED GRINDING MACHINE Re. 18,149

Original Filed Feb. 17, 1926 5 Sheets-Sheet 3

Inventor
Frank E. Stratton
By
Thomas A. Jenckes Jr.
Attorney

F. E. STRATTON

Aug. 11, 1931. FLUID PRESSURE ACTUATED GRINDING MACHINE Re. 18,149

Original Filed Feb. 17, 1926 5 Sheets-Sheet 4

Inventor
Frank E. Stratton
By Thomas A. Jenckes Jr.
Attorney

F. E. STRATTON
Aug. 11, 1931. FLUID PRESSURE ACTUATED GRINDING MACHINE
Re. 18,149
Original Filed Feb. 17, 1926 5 Sheets-Sheet 5
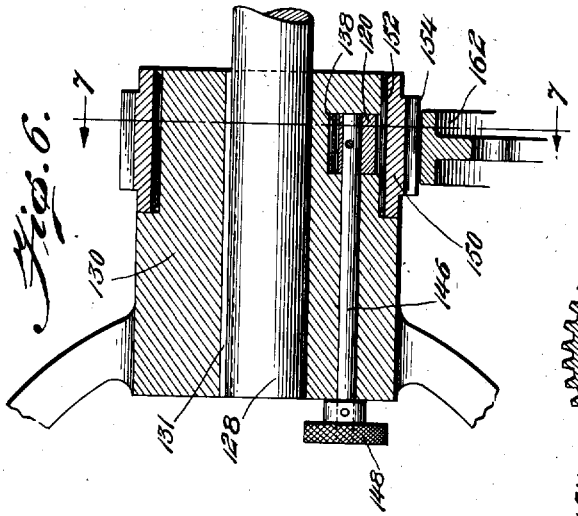
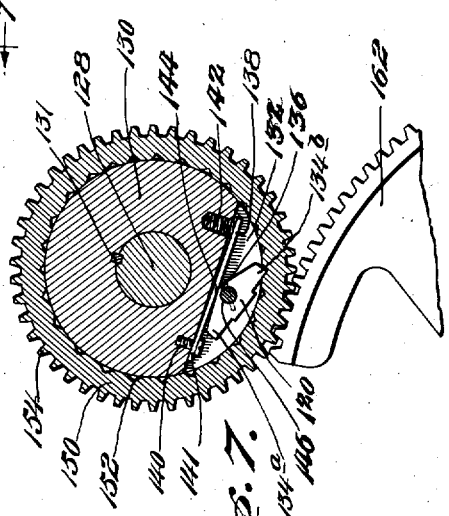
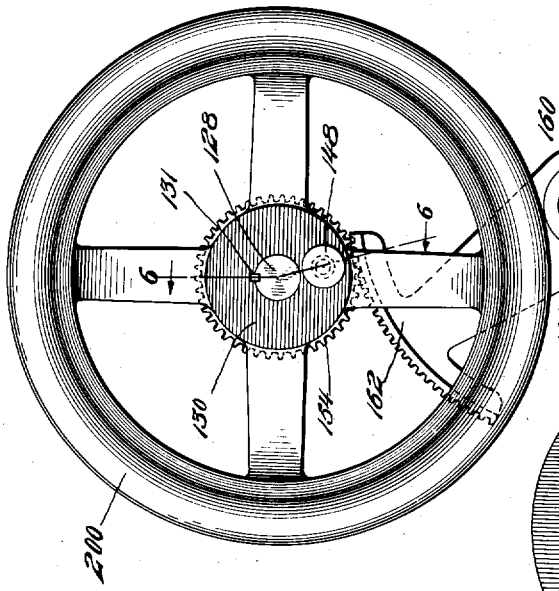
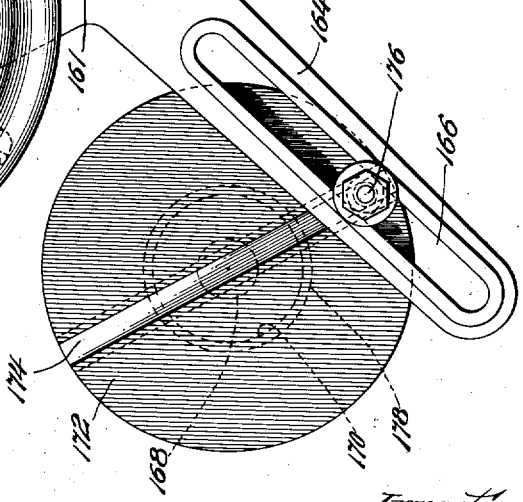
Inventor
Frank E. Stratton
By Thomas A. Jenckes Jr.
Attorney

BEST AVAILABLE COPY

Reissued Aug. 11, 1931

Re. 18,149

UNITED STATES PATENT OFFICE

FRANK R. STRATTON, OF CRANSTON, RHODE ISLAND, ASSIGNOR TO DIAMOND MACHINE COMPANY, OF PROVIDENCE, RHODE ISLAND, A CORPORATION OF RHODE ISLAND

FLUID PRESSURE ACTUATED GRINDING MACHINE

Original No. 1,725,489, dated August 20, 1929, Serial No. 88,805, filed February 17, 1926. Application for reissue filed May 31, 1930. Serial No. 458,765.

My invention relates to grinding machines, specifically to the type wherein the various parts thereof are liquid-pressure actuated.

Liquid operated grinders, particularly of the type where the work carriage is reciprocated by liquid-pressure give a finer finish than mechanically reciprocated grinders. In mechanically operated grinders, which are usually driven by gearing, there is always a direct relation between the table and the wheel and irregularities in the wheel or work are apt to coincide periodically to produce imperfect work, whereas if there is no direct relation between the work and the grinding wheel, which is the case when the work is reciprocated by liquid-pressure actuated means, there will be no periodic coincidence of irregularities and therefore a better and more even finish will be produced. In general, liquid reciprocated grinding machines are cheaper to build than mechanically reciprocated grinding machines with their numerous necessary change gears.

I am aware that the work tables of grinding machines have hitherto been reciprocated by liquid pressure. These have usually been reciprocated by a unitary direction slow speed pump with the changes in flow produced by an elaborate valve system. I believe that I am the first to employ a high speed, variable stroke, reversible flow pump for this purpose. By employing a pump of this type to reciprocate the work table of a grinding machine, I produce the following advantages: The table is reciprocated at a much higher speed than hitherto, an infinite number of speeds of travel are possible and the reversible pump may be readily connected to a grinding machine of this discription so as to be automatically reversed without the addition of much separate mechanism. Due to the fact that this type of pump rotates at a very high speed, the table drive is much more even and the finish is consequently smoother than in the slow type of pump.

In addition to providing liquid operated means to reciprocate the work table, I preferably also provide liquid operated means to traverse the rotating tool holder across the work. By providing the combination of liquid operated means for traversing the tool and liquid operated means for reciprocating the work, as I do, I permit the liquid operated means for traversing the tool to act as a shock absorber for the travel of the table at the end of each stroke. I also preferably so connect said liquid operated means for reciprocating the work table and liquid operated means for traversing the tool carriage that the traversing mechanism may act between the strokes of the table reciprocating mechanism. In former types of machines, the traversing mechanism has itself been actuated directly by the slowly moving table. In my machine, it is not necessary for the table to move so far as in former devices or to use up sufficient energy to actually move the tool, it is merely necessary for the table to use up enough energy to trip the reversing mechanism of the pump and then the liquid operated traversing mechanism will operate of itself. The traversing mechanism operates very quickly and finishes its motion before the work table may begin to move back on the next stroke, thus saving the time which would be wasted by the former types of grinders in which a considerable motion of the slowly moving table was necessary to move the traversing mechanism. By permitting the liquid operated means to actuate the traversing rotating tool and thereby to act as a cushioning device for the table or by providing pressure relief valves in the liquid system for traversing the table to function as cushioning devices as needed, I eliminate the necessity of employing an elaborate elastic air cushioning system of cylinders, etc., formerly employed in machines of this type.

In addition, I believe that I am the first to provide liquid operating means for reciprocating the work table of grinding machines with two cylinders and their respective pistons. By employing two cylinders of equal size, the necessary volume of liquid to properly reciprocate the table is always constant and consequently no further means are necessary to intermittently let in or release liquid from the pressure liquid operated system. In former machines of this type, in order to secure the desired travel of the table, it has been common for the ends of the cylinder pistons, or both to extend beyond the ends of the table. By employing two cylinders which overlap, all former overhang may be eliminated, and the size of the entire machine considerably reduced, thus saving a considerable amount of always valuable floor space and eliminating the hazard to workmen of dangerous extensions on the moving table. By employing two pistons and their respective cylinders it is always possible to have the pistons pull the table in each direction instead of pushing it as formerly. By keeping the piston rod in tension, it may be made much smaller than otherwise and trouble with leakage at the stuffing box greatly reduced, and in addition the piston rod may be kept in a line with the cylinders much more readily.

These and such other objects of my invention as may hereinafter appear will be best understood from a description of one embodiment thereof, such as is shown in the accompanying drawings.

In the drawings, Figure 1 is a front elevation of a grinding machine equipped with my invention.

Figure 5 is an enlarged front view of a part of the tool carriage traversing mechanism.

Figure 6 is a sectional view thereof taken along the line 6—6 of Figure 5.

Figure 7 is a sectional view taken along the line 7—7 of Figure 6.

Figure 1:
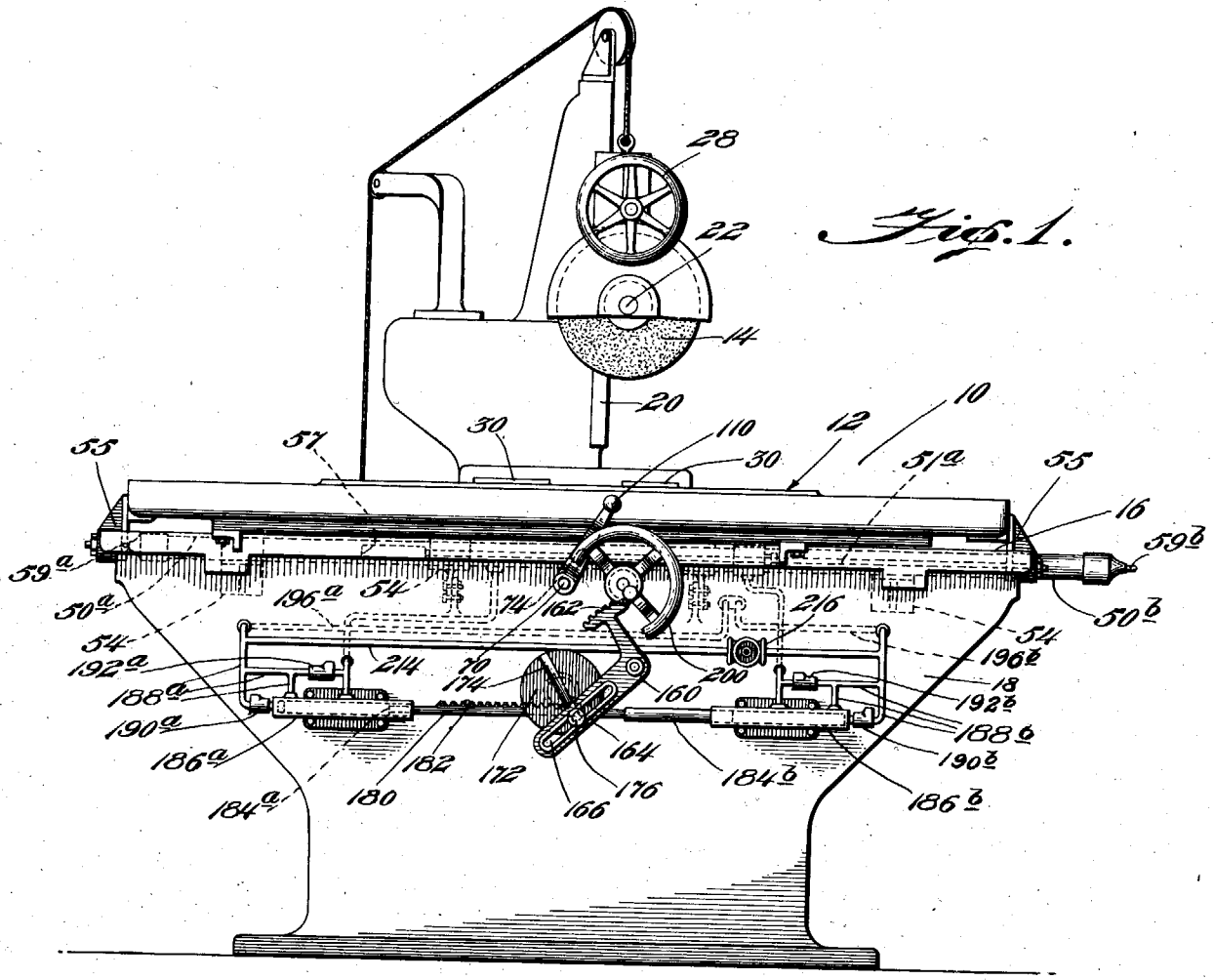

In the drawings, wherein like characters of reference indicate like parts throughout, 10 generally indicates a grinding machine of the type having a reciprocating work holding table 12 and a carriage 20 for a rotating grinding tool 14 normally traversed across the work. As explained, it is to the specific mechanism for traversing the rotating tool and for reciprocating the work holding table that my invention relates. The work holding table 12 is suitably mounted in runways 16 on the bed 18 of said machine, as usual.

The grinding machine 10 is provided with the usual carriage 20 for mounting the grinding wheel spindle 22 thereon in the usual manner, which has the grinding wheel 14 mounted as usual on the front end thereof, so that the grinding wheel 14 may readily rotate as usual above the work table 12. The grinding wheel spindle 22 is suitably rotated as usual by the belt 24 driven in the usual manner by the motor 26.

The grinding wheel spindle 22 may be raised and lowered by the usual mechanisms on revolutions of the hand wheel 28. The vertical supporting carriage 20 for mounting the grinding wheel spindle 22 is mounted on the runway 30 on the bed 18 so that the grinding wheel 14 may be traversed across the work table in a manner to be later explained. To cool the work and cleanse the contacting surface of the grinding wheel 14, the grinding machine is also preferably provided with a water supply line 32 which pours water onto the working tool 14, the water therefor being suitably supplied as usual by the water pump 34 actuated in any suitable manner by the motor 26.

As stated, I provide liquid actuated means to reciprocate the work table 12, and also preferably liquid actuated means to traverse the grinding wheel 14 across the work. A source of liquid under pressure is necessary to actuate said means. As such a suitable source of liquid pressure, I provide a pump 40, having means to reverse the flow therefrom. In my preferred embodiment I preferably employ a variable speed reversible flow pump driven at constant speed by a power-train from the motor 26, preferably one of the Hele-Shaw type, such as is shown and described in Pat. #1,077,979 issued November 11, 1913 to H. S. Hele-Shaw and F. L. Martineau. Said pump 40 is also provided with means whereby the rate of pumping may be varied, such as the hand wheel 42, and means to reverse the flow therefrom which in the embodiment shown comprises the rod 44 It is obvious, however, that in place of a reversible flow pump, a unidirectional pump provided with a valve system to reverse the flow therefrom may be employed, or that the unidirectional pump be provided with a reversible drive therefor.

As stated, I provide liquid actuated means actuated by the pump 40 to reciprocate the work table 12, which I will now describe. I provide two cylinders $50^a$ and $50^b$ preferably of equal size. I attach said cylinders $50^a$ and $50^b$ to the machine bed 18 preferably parallel to each other and to the direction of motion of the work table 12. Said cylinders $50^a$ and $50^b$ are each preferably provided with a stuffing box 52 at one end thereof. Said cylinders $50^a$ and $50^b$ are preferably mounted on the machine bed 18 by means of the brackets 54, with their outer or stuffing box ends 56 preferably adjacent to each other and with their opposite inner ends 58 preferably pointing in opposite directions, said cylinders $50^a$ and $50^b$ thus overlapping and extending in opposite directions on the machine bed 18.

I provide the pipe lines $60^a$ and $60^b$ to connect the pump 40 with each respective cylinder $50^a$ and $50^b$ preferably at the stuffing box end 56 thereof, though they may be connected to said cylinders in any other suitable fashion.

To reciprocate in said cylinders $50^a$ and $50^b$,

I provide the two piston rods 51ᵃ and 51ᵇ, each having the outer end 53 thereof attached to the base of the work holding table 12 by means of the bracket 55 and the opposite inner end thereof terminating in the piston head 57, being thus adapted to be alternately, with changes in reversal of flow from said pump, forced inwardly of said cylinders 50ᵃ and 50ᵇ to thereby effect a pulling movement of said work holding table 12.

Figure 2:
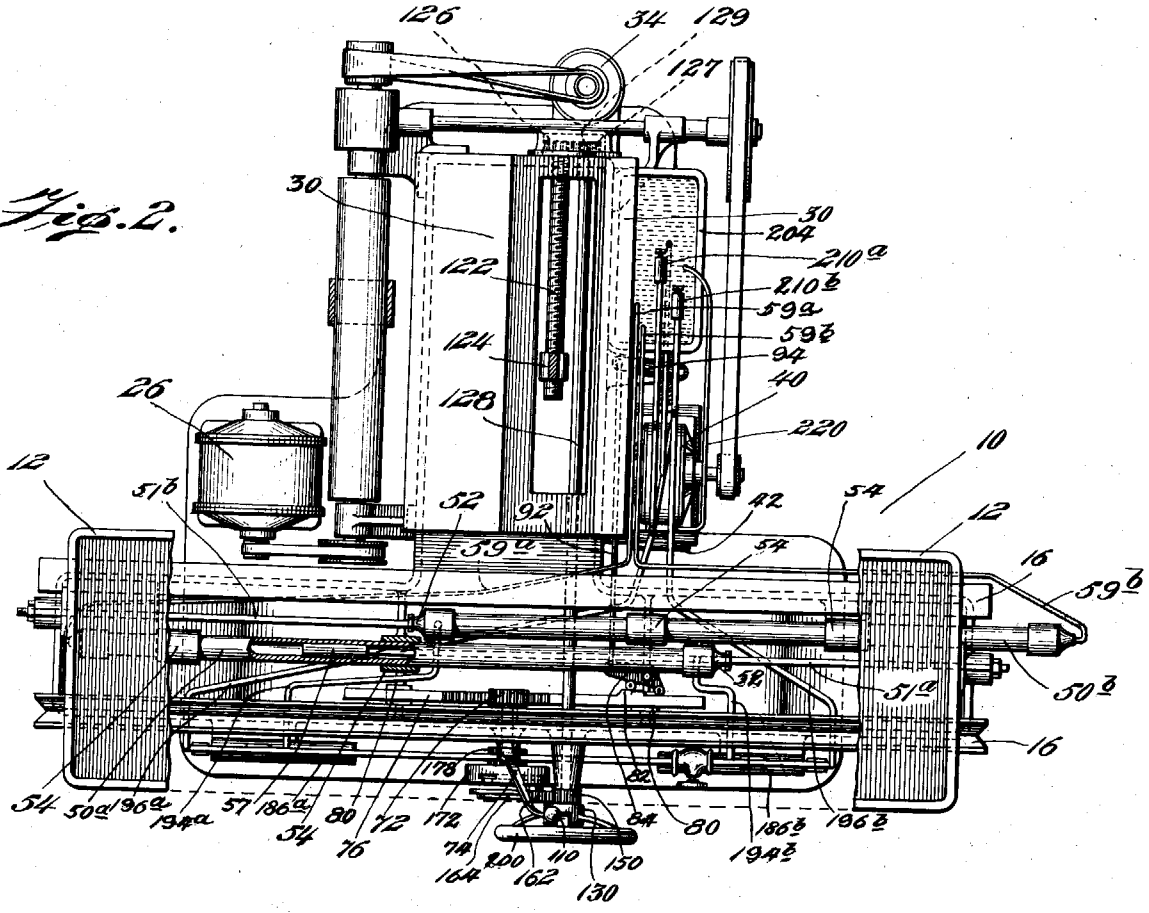
Figure 2 is a plan view of said machine, with the column and its attached parts removed.
Figure 3:
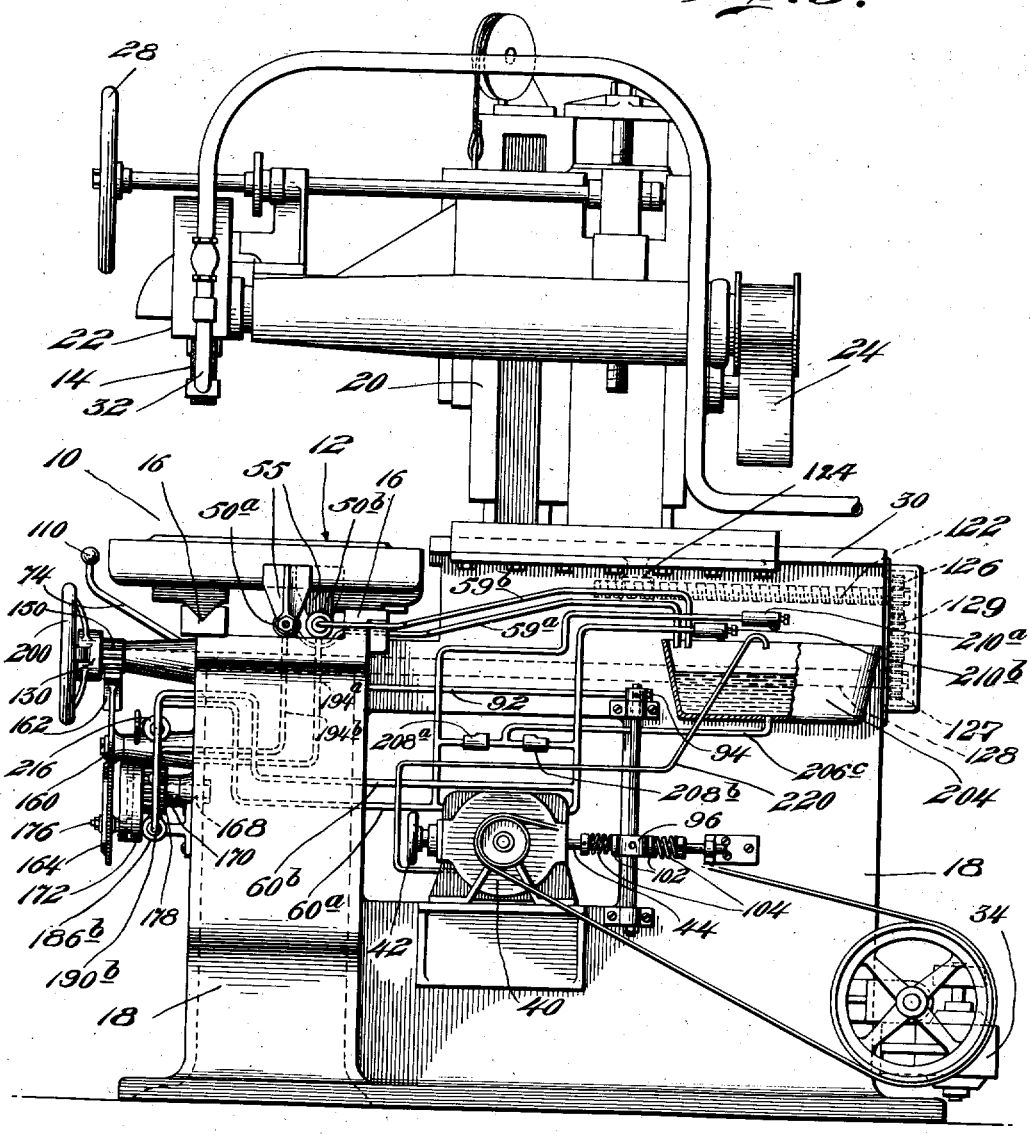
Figure 3 is an end elevation of said machine.

The piston rod 51ᵃ passes through a boss on the bracket 55 connected to the work holding table 12, the end of the rod 51 being threaded and carrying a nut. Similarly the rod 51ᵇ passes through a boss connected to the bracket 55 at the other end of the table. The end of the rod 51ᵇ is also threaded and carries a nut. Said nuts are adapted to engage the end of each boss, the rods being slidable in the respective bosses, thus forming a slidably engaging connection so that the table may be moved from one end of its stroke to the other by means of the rods, and in the movement of the table, the rods are thus subjected only to tension. It will be apparent that in the movement of the table to the right in Fig. 2 by means of the rod 51ᵇ, the rod 51ᵃ is not subjected to compression, but in fact is subjected slightly to tension for the reason that the piston and the rod attached thereto are pulled to the right by means of its respective nut and associated parts. Similarly in the movement of the work table to the left, which is accomplished by means of the piston head 57, the piston rod 51ᵃ and associated parts above described, the piston rod 51ᵇ is not subjected to compression but in fact is also subjected to slight tension in that the rod and associated parts are pulled to the left.

I also provide means to effect a reversal of liquid flow to the space in each cylinder 50ᵃ and 50ᵇ between the outer ends 56 of said cylinders and the piston heads 57 to thereby cause a change of direction and the reciprocation of said table 12. In my preferred embodiment, said means includes a shaft 70 pivoted transversely of the machine, having the pinion 72 mounted thereon and the shipper rod 74 keyed thereto so as to extend upwardly therefrom. I also provide a horizontally movable rack 76 having the teeth 78 on one edge thereof adapted to be enmeshed by the teeth of the pinion 72. Said reciprocating rack 76 is suitably mounted in the guides 80 on the machine bed 18, and is provided at the opposite end thereof with the cam 82. A lever 84 having the studs 86ᵃ and 86ᵇ projecting therefrom at a spaced distance is suitably pivoted on a bracket 88 attached to the machine bed 18. The opposite end of said lever 84 from the projecting stud 86ᵃ terminates in the arm 90, having the elongated link 92 pivotally attached thereto. The opposite end of said elongated link 92 is pivotally attached to the arm 94 of the bell crank lever 96 suitably pivoted on the bracket 98 attached to the machine bed 18. The opposite arm of said bell crank lever 96 terminates in the rounded end 100. The pump flow reverse rod 44 is provided with the washers 102 on each side of said end 100. It is thus obvious that as the end 100 is swung first in one direction and then in the other, the rod 44 will act upon the pump 40 to cause a change in the direction of flow therefrom. The springs 104 having fixed bases anchored to the rod 44 are preferably provided to abut the slidable washers 102 to absorb the shock of suddenly reversing the rod 44 at the end of each stroke so that it is not transmitted to the pump 40. It is obvious that said just described means includes the pivoted member or shipper rod 74.

Figure 4:
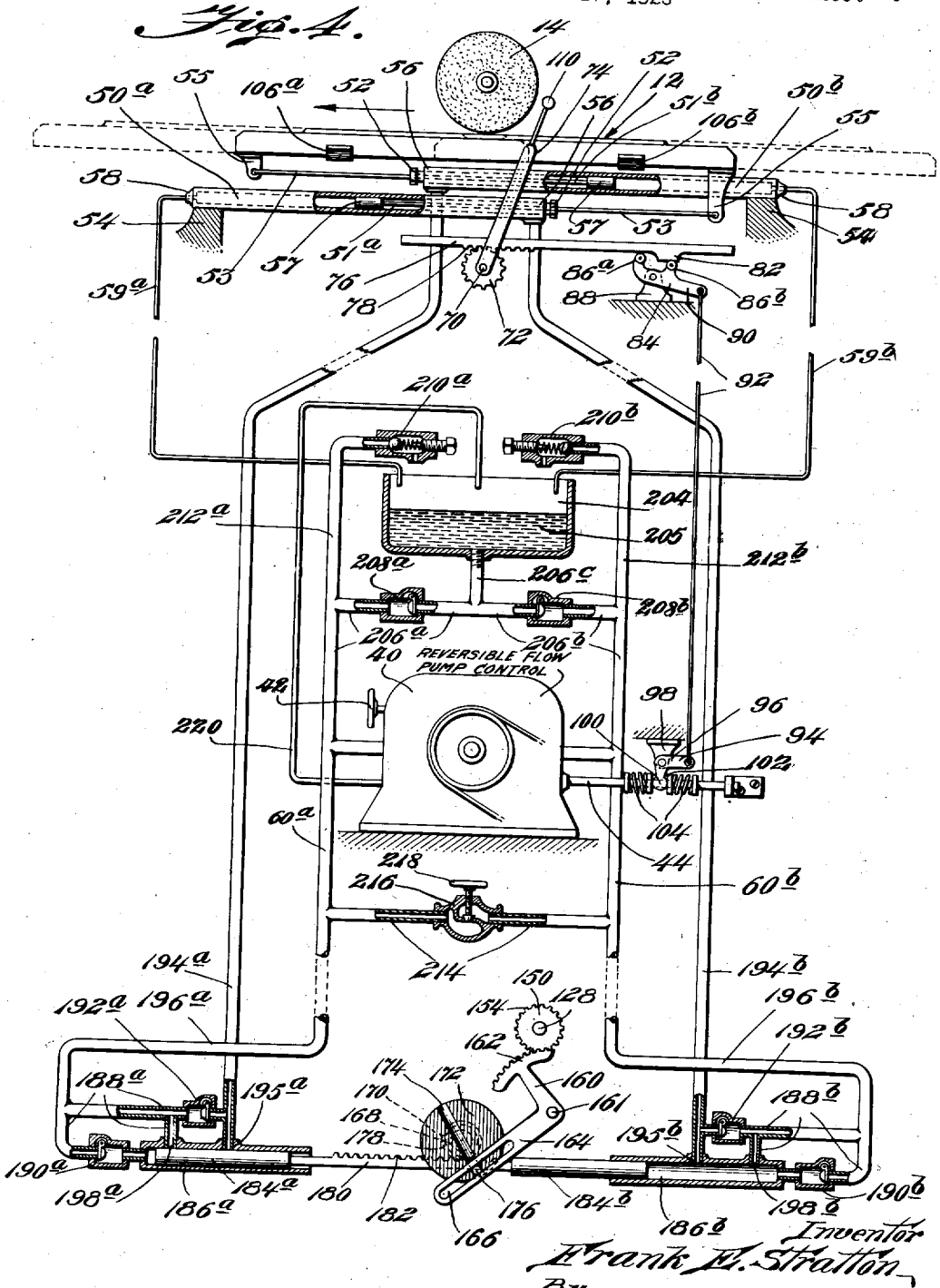
Figure 4 is a diagrammatic skeleton view, illustrating the functioning and coordination of the various elements of the liquid operated system constructed in accordance with my invention.

I provide means functioning automatically at the end of each table stroke to move said pivoted member or shipper rod 74 to actuate said flow reversing means. The preferred embodiment of such means includes the studs 106ᵃ and 106ᵇ mounted on the work table 12 so as to be longitudinally adjustable thereon. The operation of said liquid operated table reciprocating means is obvious from the above description. When, as shown in Figure 4, the stud 106ᵇ strikes the shipper rod 74 as the table has almost reached the end of its travel in the direction of the arrow, it will push the shipper rod 74 to the left, which will cause the rack 76 to move also toward the left, thereby causing the cam 82 to depress the lug 86ᵃ thereby raising the link 92 which in turn will cause the end 100 to move outwardly to cause the rod 44 to move outwardly to effect a reversal of the pump. As the table nears the end of its stroke in the opposite direction, it is obvious that the lug 106ᵃ will cause a reversal of these motions to obtain a flow of liquid in the opposite direction.

In addition, I preferably provide manually operable means for independently actuating the flow reversible means to independently interrupt and reverse the table reciprocating means. In my preferred embodiment, said means comprises the handle 110 secured to the shaft 70. It is thus obvious that the handle 110 will pivot the shaft 70 to reverse the flow from said pump to independently interrupt or reverse the travel of the table 12 at the will of the operator.

I also preferably provide means to traverse the tool carriage, preferably including a manually reversible pawl 120 to change the direction of traverse; this pawl may be manually moved and set in a neutral position in which the pawl 120 is disengaged. As stated, the grinding tool carriage 20 may be traversed across the machine bed 18 on the runway 30. To accomplish this result, I suitably mount on the machine bed 18 transversely thereof the revolvable screw threaded rod 122 adapted to receive the threaded nut 124 which is firmly secured to the base of the grinding tool carriage 20. The rear end of the rod 122 is provided with a gear 126. I also provide the rod 128 extending transversely across the bed of the machine and suitably mounted on said bed 18, said rod 128 having the gear 127 at the rear end thereof adapted to drive through the medium of the idler gear 129, the gear 126 fast on the screw threaded rod 122. It is thus obvious that as the rod 128 is revolved, the transversely extending threaded rod 122 will also be revolved and that the nut 124 moving thereon will move the carriage 20 back and forth across said machine bed 18 on the runway 30.

I key the hub 130 to the front end of said shaft 128 by means of the key 131. Said hub 130 is provided with a segmental recess 132. The pawl 120 is suitably pivoted on the hub 130 within the recess 132. The pawl 120 is provided with the projections 134ᵃ and 134ᵇ at each end thereof and has a V shaped projection 136 at the inner radial side thereof. The broken away portion 132 of the hub 130 is provided with a flat spring blade 138, having one end 141 thereof firmly secured to said hub 130 by the screw 140 and having its opposite end pressed radially outwardly by the spring 142 against the V shaped projection 136 of the pawl 120, thereby holding the pawl in operative position in either direction. The blade 138 is provided with a central axial notch 144 adapted to receive the V shaped projection 136 of said pawl 120 therein when said pawl 120 is revolved to a neutral position by means of revolving the shaft 146 on which it is keyed by medium of the handle 148 fastened on the opposite exposed end thereof.

I provide the toothed sleeve 150 to revolve upon said hub 130. Said sleeve 150 is provided with the interior radially exposed axial notches 152 and the gear teeth 154 on the outer periphery thereof. It is obvious that as the pawl 120 is set first on one side and then on the other by means of the handle 148 that the respective projection 134ᵃ or 134ᵇ of said pawl 120 will engage in said notches 152 to permit the toothed sleeve 150 to drive the hub 130 and consequently the shaft 128 keyed thereto in either direction.

In addition to liquid operated means to effect the reciprocation of the table, I preferably also provide liquid operated means automatically actuated by said pump on a change in liquid flow to actuate said traversing means, though it is obvious that mechanical or other means may be provided for actuating the traversing mechanism if desired. I provide the bell crank lever 160 suitably pivoted to the machine bed 18, as at 161, the work arm thereof projecting upwardly therefrom and terminating in the toothed segment 162, said toothed segment being adapted to engage the teeth 154 on the outer periphery of the sleeve 150. The power arm 164 of said bell crank lever 160 is preferably provided with the longitudinal slot 166. The stud shaft 168 is also mounted transversely on the machine bed 18. The front end of said stud 168 has a sleeve 170 loosely mounted thereon, the front end thereof terminating in the disc 172, having the groove 174 extending diametrically across the front face thereof. The crank pin 176 fastened in said groove 174 engages the elongated slot 166 of the bell crank lever 160 whereby the segment 162 is reciprocated upon a revolution of said disc 172. The inner end of the sleeve 170 is provided with the pinion 178.

A rack 180 is provided with the teeth 182 on one edge thereof adapted to enmesh with the teeth of the pinion 178 to cause a revolution of said sleeve 170. The rack 180 is preferably provided with piston heads 184ᵃ and 184ᵇ at each end thereof, though it is obvious that a rack mechanism provided with two racks each having a piston head may be provided if desired. Cylinders 186ᵃ and 186ᵇ of slightly larger diameter than the diameter of the piston heads 184ᵃ and 184ᵇ are preferably provided to receive said respective piston heads. The pipe lines 188ᵃ and 188ᵇ having the check valves 190ᵃ and 190ᵇ and 192ᵃ and 192ᵇ therein are provided to connect each cylinder 186ᵃ and 186ᵇ with the respective pipe lines 60ᵃ and 60ᵇ, connecting said pump 40 indirectly through the transverse cylinders 186ᵃ and 186ᵇ to said table reciprocating cylinders 50ᵃ and 50ᵇ, said pipe lines 188ᵃ and 188ᵇ with their respective valves being so connected to the said pipe lines 60ᵃ and 60ᵇ that the traversing mechanism may function on changes in direction of liquid flow prior to the reciprocation of the table and may provide a cushioning effect for said table 12. In my improved embodiment, I preferably break said lines 60ᵃ and 60ᵇ connecting said pump 40 and said table reciprocating cylinders 50ᵃ and 50ᵇ and connect the pipe lines 188ᵃ and 188ᵇ and said traversing cylinders 186ᵃ and 186ᵇ to the respective broken ends thereof. In my improved embodiment, the pipes 60ᵃ and 60ᵇ are broken into two parts 194ᵃ, 194ᵇ, 196ᵃ and 196ᵇ respectively by the traverse operating cylinders 186ᵃ and 186ᵇ and the pipe lines 188ᵃ and 188ᵇ. As thus broken, as shown in my preferred embodiment, the pipe line 60ᵃ includes the pipe line 194ᵃ which connects the traversing liquid operating cylinder 186ᵃ with the table reciprocating cylinder 50ᵇ and the pipe line 196ᵃ, which connects the pipe lines 188ᵃ connected to the table traversing cylinder 186ᵃ with the pump 40. The line 60ᵇ is similarly broken up into the corresponding parts 194ᵇ and 196ᵇ; the line 194ᵇ which connects the table traversing cylinder 186ᵇ with the table reciprocating cylinder 50ᵃ and the line 196ᵇ which connects the pipe line 188ᵇ connected to table traversing cylinder 186[b] with the pump 40. The lines 194[a] and 194[b] enter the cylinders 186[a] and 186[b] at ports 195[a] and 195[b] near the center thereof. Check valve 192[a] and lines 188[a] permit the flow of liquid back from the cylinder 50[b] through lines 194[a] and 188[a] and through 196[a] into the pump; and similarly with the other side of the system. The check valve 190[a] is connected in the lines 196[a] and 188[a] to permit liquid to flow from the pump 40 into the cylinder 186[a] when it is at its extreme innermost position as shown in Figure 4 to force the piston head 184[a] outwardly to uncover port 198[a] whereby the liquid will be fed from the pump 40 into the cylinder 186[a] through the port 198[a], as well as 190[a].

When the table 12 nears the end of its stroke, the motion of the liquid from the pump will be reversed, and the liquid will then flow through the pipe 196[a], through the check valve 190[a] and force the traverse operating rack 180 and piston head 184[a] outwardly until the piston head 184[a] uncovers the port 195[a] near the middle of the cylinder and permits the liquid to flow through pipe 194[a] to the cylinder 50[b]. This sudden increase of pressure in the cylinder 50[b] will stop the table 12, and the impact of stopping the table in its motion and re-starting it in the opposite direction will continue to force the piston 184[a] outwardly, thereby absorbing the shock of table reversal, the fluid in the end of the cylinder 186[a] adjacent the check valve 190[a] leaking outwards around the piston head 184[a] within the cylinder. This rapid motion of the rack 180 will be absorbed by the piston head 184[b] squeezing the liquid out through the port 198[b], so that the table 12 stops without shock. As the line 194[b] is disconnected from the line 196[b] by the covering of port 195[b] by the piston head 184[b], the liquid will be unable to be forced out from cylinder 50[a] and back into the pump 40. The check valve 192[b] is provided to permit this return flow from the cylinder 50[a] to the pump 40 to take place through line 194[b], the check valve 192[b] and the lines 188[b] and 196[b]. The function and method of operation of this valve system is thus shown. It is apparent that the traversing means functions at the end of each stroke of the work table 12 and before the beginning of its stroke in the opposite direction, and also acts as a cushioning device for said table.

In addition to the means just described for automatically actuating the traversing mechanism, I provide manually operable means to actuate said traversing mechanism. In my preferred embodiment said manually operable means comprises a hand wheel 200 on the front end of the hub 130 integral therewith, said hand wheel 200 being manually operable when the pawl 120 is in any position. It will operate more easily, however, if the pawl 120 is moved to a neutral position by means of turning the shaft 146 through the medium of the handle 148 so that the V-shaped projection 136 thereof may register in the groove 144 of the spring blade 138.

To insure a supply of liquid in the liquid system at all times I preferably also provide the liquid reservoir 204 suitably mounted in the bed of the machine in a convenient position higher than the pump 40.

To insure that the liquid system will at all times have a supply of liquid, I provide the pipes 206[a] and 206[b] leading from said reservoir 204 to said pump 40, said pipes 206[a] and 206[b] preferably terminating in one common pipe 206[c] discharging from the base of the reservoir 204. At convenient points in said pipes 206[a] and 206[b], I provide the check valves 208[a] and 208[b]. It is thus obvious that when there is insufficient liquid in the cylinders or the pipe lines, due to leakage or otherwise, the suction caused by the vacuum created thereby will open either check valve 208[a] or 208[b] to permit the deficiency to be made up from the supply of liquid 205 in the reservoir 204. This will serve to keep the suction side of the pump 40 at substantially atmospheric pressure at all times.

In case any excessive pressure is created in any part of the liquid system, whether it be a cylinder, pump, etc., I provide the pressure relief valves 210[a] and 210[b] to eliminate the shock or hammer that would otherwise be caused thereby. Said pressure relief valves 210[a] and 210[b], preferably discharge over the reservoir 204. I provide pipe lines 212[a] and 212[b] leading from said valves to each table reciprocating cylinder 50[a] and 50[b] respectively in my preferred embodiment through the traverse cylinders 186[a] and 186[b]. In my preferred embodiment I preferably only extend said pipe lines 212[a] and 121[b] to connect with the pipe lines 206[a] and 206[b] leading from the reservoir to the pump. As said pressure relief valves 210[a] and 210[b] function also as cushioning devices, where the liquid operated means to actuate the traversing mechanism is employed as in my preferred embodiment they are not really necessary and may be dispensed with, but they are absolutely essential as cushioning means when the liquid operated table reciprocating means is employed alone and function at the end of each stroke.

In addition I provide manually controlled means to keep the table 12 from creeping when the work table is not being reciprocated. In my preferred embodiment I preferably accomplish this by connecting a pipe line 214 across the pump 40, thus in my preferred embodiment the pipe line 214 is connected to the pipe lines 60[a] and 60[b] leading from the table reciprocating cylinder 50[a] and 50[b] to the pump. I provide said pipe line 214 with the bypass valve 216 operable by the hand wheel 218 to equalize the pressure in said pipe lines 60ᵃ and 60ᵇ and thus across the pump 40 to achieve a positive stop of said liquid operating mechanism when desired.

I also preferably provide the drain pipe lines 59ᵃ and 59ᵇ leading from the inner ends 58 of the cylinders 50ᵃ and 50ᵇ to the reservoir 204, to carry off any leakage past the pistons 57. I also preferably provide the drain pipe line 220 leading from the pump 40 to the reservoir 204 to carry away from the pump 40 the leakage inherent in that type of pump.

Though the means for manually controlling the table reciprocating means, the means for manually controlling the tool carriage traversing means and the means to prevent the table from creeping are valuable adjuncts of my machine, they may be omitted if desired.

Though I have shown in my preferred embodiment the work carriage reciprocated and the tool carriage traversed, it is obvious that the tool carriage may be reciprocated and the work carriage traversed without departing from the spirit of my invention, and that so long as one of these carriages is moved by the liquid pressure means described, if desired the tool carriage may be reciprocated or the work carriage traversed in any other manner than by the liquid pressure system shown without departing from the spirit of my invention.

As hitherto explained the liquid operated means for traversing the carriage for the rotating tool may be replaced by a mechanical or other device for this purpose, when as explained, the pressure relief valves become essential for cushioning the table.

Whereas I have shown in my preferred embodiment my invention employed with a surface grinding machine where the tool is actually moved across the work, it is obvious that it may be employed with a face grinding machine where the tool is merely fed against the work as it is ground down, and I therefore in the claims employ the word "traverse" to signify any movement of one carriage substantially at right angles to the movement of the other reciprocating carriage.

It is understood that my invention is not limited to the specific embodiment shown and that various deviations may be made therefrom without departing from the spirit and scope of the appended claims.

What I claim as new and desire to secure by Letters Patent is:

1. In a grinding machine, the combination of a work carriage, a carriage for a rotating tool, a pump having means to reverse the flow therefrom, liquid actuated means actuated by reversal of liquid flow from said pump to effect a reciprocating movement of one of said carriages relative to said other carriage to bring the work on one carriage in operative relation with the tool on the other carriage, including two pistons, two cylinders and pipe lines connecting said cylinders to said pump, whereby the volume of liquid in said system may be kept constant each piston being connected to said reciprocating carriage by piston rods always in tension to pull it alternately in opposite directions, liquid actuated means actuated by a reversal of flow from said pump to effect a movement of the other of said carriages transversely of said reciprocating carriage, and means actuated by the reciprocating carriage at the end of each stroke to automaticaly reverse the direction of liquid flow from said pump to change the direction of travel of said reciprocating carriage.

2. In a grinding machine, the combination of a work carriage, a carriage for a rotating tool, a reversible flow pump, liquid actuated means actuated by reversal of liquid flow from said pump to effect a reciprocating movement of said work carriage to bring the tool on the tool carriage in operative relation to the work on said work carriage, including two pistons, two cylinders and pipe lines connecting said cylinders to said pump, whereby the volume of liquid in said system may be kept constant, liquid operated means automatically actuated by said pump to effect a movement of said tool carriage transversely of said reciprocating carriage, including rack mechanism having two oppositively disposed piston heads, a cylinder of equal size for each piston head having a slightly larger internal diameter than the diameter of the piston head, and pipe lines provided with check valves connecting each cylinder with the respective pipe lines connecting said pump and work carriage reciprocating cylinders so that the traversing mechanism may function on change in direction of liquid flow prior to the reciprocation of the work carriage and may provide a cushioning effect for said work carriage, and means actuated by the reciprocating carriage at the end of each stroke to automatically reverse the direction of liquid flow from said pump to change the direction of travel of said reciprocating carriage.

3. In a grinding machine, the combination of a work carriage, a carriage for a rotating tool, a pump having means to reverse the flow therefrom, liquid actuated means actuated by reversal of liquid flow from said pump to effect a reciprocating movement of one of said carriages relative to said other carriage to bring the work on one carriage in operative relation with the tool on the other carriage, including two pistons, two cylinders and pipe lines connecting said cylinders to said pump, whereby the volume of liquid in said system may be kept constant each piston being connected to said reciprocating carriage to pull it alternately in opposite directions by means of rods attached thereto through a connection operated to engage in only one direction so that the said rods are subjected to tension only, and means actuated by the reciprocating carriage at the end of each stroke to automatically reverse the direction of liquid flow from said pump to change the direction of travel of said reciprocating carriage.

4. In a grinding machine, the combination of a work holding table, a carriage for a rotating grinding tool, a pump having means to reverse the flow therefrom, liquid operated means actuated by said pump to reciprocate said table comprising two cylinders attached to the machine bed, a pipe line connecting each cylinder with said pump, two pistons attached to the base of said table reciprocated in said cylinders by liquid from said pump, means to effect a reversal of fluid flow to each cylinder, means functioning automatically at the end of each table stroke to actuate said flow reversal means, manually operable means for independently actuating said flow reversal means to independently interrupt and reverse the travel of said table, means to traverse the tool carriage, liquid operated means automatically actuated by said pump on a reversal of liquid flow to actuate said traversing means connected to the pipe lines connecting said pump and each table reciprocating cylinder in series so as to function prior to any reciprocation of said table, manually operable means to actuate said traversing means, a liquid reservoir, pipe lines connecting said pump to said reservoir, check valves in said lines to insure a supply of liquid in said system, pressure relief valves discharging into said reservoir, pipe lines leading from each table reciprocating cylinder to said valves, and a pipe line connecting the pipe lines from said pump having a bypass valve therein to equalize the pressure in said lines to achieve a positive stop of said liquid operating mechanisms.

5. In a grinding machine, the combination of a work holding table, a carriage for a rotating grinding tool, a pump having means to reverse the flow therefrom, liquid operated means actuated by said pump to reciprocate said table comprising two cylinders attached to the machine bed, a pipe line connecting each cylinder with said pump, two pistons attached to the base of said table reciprocated in said cylinders by liquid from said pump, means to effect a reversal of liquid flow to each cylinder, means functioning automatically at the end of each table stroke to actuate said flow reversal means, means to traverse the tool carriage, liquid operated means automatically actuated by said pump on a reversal of liquid flow to actuate said traversing means connected to the pipe lines connecting said pump and each table reciprocating cylinder in series so as to function prior to any reciprocation of said table.

6. In a grinding machine, the combination of a work holding table, a carriage for a rotating grinding tool, a pump having means to reverse the flow therefrom, liquid operated means actuated by said pump to reciprocate said table comprising two cylinders attached to the machine bed, a pipe line connecting each cylinder with said pump, two pistons attached by means of a slidable engaging connection to the base of said table alternately forced inwardly of said cylinders to subject said rods to tension only and affect a pulling movement of the table by liquid from said pump, means to effect a reversal of liquid flow to each cylinder, means functioning automatically at the end of each table stroke to actuate said flow reversal means, manually operable means for independently actuating said flow reversal means to independently interrupt and reverse the travel of said table, a liquid reservoir, pipe lines connecting said pump to said reservoir, check valves in said pump to said reservoir, check valves in said lines to insure a supply of liquid in said system, pressure relief valves discharging into said reservoir pipe lines leading from each table reciprocating cylinder to said valves, and a pipe line connecting the pipe lines from said pump having a bypass valve therein to equalize the pressure in said lines to achieve a positive stop of said liquid operated mechanisms.

7. In a grinding machine, the combination of a work holding table, a carriage for a rotating grinding tool, a pump having means to reverse the flow therefrom, liquid operated means actuated by said pump to reciprocate said table comprising two cylinders attached to the machine bed, a pipe line connecting each cylinder with said pump, two pistons attached by means of a slidably engaging connection to the base of said table alternately forced inwardly of said cylinders to subject said rods to tension only and to effect a pulling movement of the table by liquid from said pump, means to effect a reversal of liquid flow to each cylinder, and means functioning automatically at the end of each table stroke to actuate said flow reversal means.

8. In a grinding machine, the combination of a work holding table, a carriage for a rotating grinding tool, a pump having means to reverse the flow therefrom, liquid operated means actuated by said pump to reciprocate said table comprising two cylinders attached to the machine bed, a pipe line connecting each cylinder with said pump, two pistons attached to the base of said table alternately forced inwardly of said cylinders to effect a pulling movement of the table by liquid from said pump, means to effect a reversal of liquid flow to each cylinder, means functioning automatically at the end of each table stroke to actuate said flow reversal means, means to traverse the tool carriage, and liquid operated means automatically actuated by said pump on a reversal of liquid flow to actuate said traversing means.

9. In a grinding machine, the combination of a work holding table, a carriage for a rotating grinding tool, a pump having means to reverse the flow therefrom, liquid operated means actuated by said pump to reciprocate said table comprising two cylinders of equal size having stuffing boxes at one end thereof attached to the machine bed parallel to each other with their stuffing box ends adjacent and overlapping and their other ends pointing in opposite directions, a pipe line connecting the stuffing box end of each cylinder with said pump, two piston rods each having one end thereof attached to the base of said table and the opposite end thereof terminating in a piston head adapted to be alternately with changes in reversal of flow from said pump forced inwardly of said cylinders to thereby effect a pulling movement of said table, means including a pivoted member to effect a reversal of liquid flow to each cylinder, means functioning automatically at the end of each table stroke to move said pivoted member to actuate said flow reversal means, manually operable means attached to said pivoted member for independently actuating said flow reversal means to independently interrupt and reverse the travel of said table, means to traverse the tool carriage including a manually reversible pawl to change the direction of traverse, liquid operated means automatically actuated by said pump on a change in liquid flow to actuate said traversing means, including rack mechanism having two oppositely disposed piston heads, a cylinder of equal size for each piston head having a slightly larger internal diameter than the diameter of its respective piston head, and pipe lines provided with check valves connecting each cylinder with the respective pipe lines connecting said pump and table reciprocating cylinders so that the traversing mechanism may function on change in direction of liquid flow prior to the reciprocation of the table and may provide a cushioning effect for said table, manually operable means to actuate said traversing means, a liquid reservoir, pipe lines leading from said reservoir to said pump, check valves in said lines to insure a supply of liquid in said system, pressure relief valves discharging into said reservoir, pipe lines leading from each table reciprocating cylinder to said valves, and a pipe line connecting the pipe lines from said pump having a by-pass valve therein to equalize the pressure in said lines to achieve a positive stop of said liquid operated mechanisms.

10. In a grinding machine, the combination of a work holding table, a carriage for a rotating grinding tool, a pump having means to reverse the flow therefrom, liquid operated means actuated by said pump to reciprocate said table comprising two cylinders of equal size having stuffing boxes at one end thereof attached to the machine bed parallel to each other with their stuffing box ends adjacent and overlapping and their other ends pointing in opposite directions, a pipe line connecting the stuffing box end of each cylinder with said pump, two piston rods each having one end thereof attached to the base of said table and the opposite end thereof terminating in a piston head adapted to be alternately, with changes in reversal of flow from said pump, forced inwardly of said cylinders to thereby effect a pulling movement of said table, means including a pivoted member to effect a reversal of liquid flow to each cylinder, means functioning automatically at the end of each table stroke to move said pivoted member to actuate said flow reversal means, means to traverse the tool carriage including a manually reversible pawl to change the direction of traverse, liquid operated means automatically actuated by said pump on a change in liquid flow to actuate said traversing means, including rack mechanism having two oppositely disposed piston heads, a cylinder of equal size for each piston head having a slightly larger internal diameter than the diameter of its respective piston head, and pipe lines provided with check valves connecting each cylinder with the respective pipe lines connecting said pump and table reciprocating cylinders so that the traversing mechanism may function on change in direction of liquid flow prior to the reciprocation of the table and may provide a cushioning effect for said table.

11. In a grinding machine, the combination of a work holding table, a carriage for a rotating grinding tool, a pump having means to reverse the flow therefrom, liquid operated means actuated by said pump to reciprocate said table comprising two cylinders of equal size having stuffing boxes at one end thereof attached to the machine bed parallel to each other with their stuffing box ends adjacent and overlapping and their other ends pointing in opposite directions, a pipe line connecting the stuffing box end of each cylinder with said pump, two piston rods each having one end thereof attached to the base of said table through a connection operating to engage said base so that the rod is subjected only to tension and the opposite end thereof terminating in a piston head adapted to be alternately with changes in reversal of flow from said pump formed inwardly of said cylinders to thereby effect a pulling movement of said table, means including a pivoted member to effect a reversal of liquid flow to each cylinder, means functioning automatically at the end of each table stroke to move said pivoted member to actuate said flow reversal means, and manually operable means attached to said pivoted member for independently actuating said flow reversal means to independently interrupt and reverse the travel of said table, a liquid reservoir, pipe lines leading from said reservoir to said pump, check valves in said lines to insure a supply of liquid in said system, pressure relief valves discharging into said reservoir, pipe lines leading from each table reciprocating cylinder to said valves, and a pipe line connecting the pipe lines from said pump having a bypass valve therein to equalize the pressure in said lines to achieve a positive stop of said liquid operated mechanisms.

12. In a grinding machine, the combination of a work holding table, a carriage for a rotating grinding tool, a pump having means to reverse the flow therefrom, liquid operated means actuated by said pump to reciprocate said table comprising two cylinders of equal size having stuffing boxes at one end thereof attached to the machine bed parallel to each other with their stuffing box ends adjacent and overlapping and their other ends pointing in opposite directions, a pipe line connecting the stuffing box end of each cylinder with said pump, two piston rods each having one end thereof and attached to the base of said table by means of a connection operating to engage said base in only one direction so that each rod is subjected only to tension and the opposite end thereof terminating in a piston head adapted to be alternately with changes in reversal of flow from said pump forced inwardly of said cylinders to thereby effect a pulling movement of said table, means including a pivoted member to effect a reversal of liquid flow to each cylinder, and means functioning automatically at the end of each table stroke to move said pivoted member to actuate said flow reversal means.

13. In a grinding machine, the combination of a work carriage, a carriage for rotating tool, a pump having means to reverse the flow therefrom, liquid actuated means actuated by reversal of liquid flow from said pump to effect a reciprocating movement of one of said carriages relative to said other carriage to bring the work on one carriage in operative relation with the tool of the other carriage, including two operable piston faces, cylinder means and pipe lines connecting said cylinder means to said pump, whereby the volume of liquid in said system may be kept constant, each piston face being connected to said reciprocating carriage by means of a rod through a form of connection permitting tension only in said rod by means of a rod through a form of connection permitting tension only in said rod to pull it alternately in opposite directions, and means actuated by the reciprocating carriage at the end of each stroke to automatically reverse the direction of liquid flow from said pump to change the direction of travel of said reciprocating carriage.

14. In a grinding machine the combination of a work-holding table, a carriage for holding a rotating grinding tool, a pump having means to reverse the flow therefrom, fluid-operated cylinder means having piston means therein actuated by said pump to reciprocate said table, pipe-line means connecting the cylinder means with said pump, said piston means in said cylinder means being so arranged that the operable piston faces are acted upon by fluid from said pump, a piston rod to actuate said table so connected to each of said faces and to said work-holding table that the fluid forces act to produce tension only in the piston rods, means to effect a reversal of fluid flow to said cylinder means, and means automatically functioning at the end of each table stroke to actuate said flow reversal means.

15. In a grinding machine the combination of a work-holding table, a carriage for holding a rotating grinding tool, a pump having means to reverse the flow therefrom, fluid operated cylinder means comprising a plurality of cylinders having piston means therein actuated by said pump to reciprocate said table, pipe-line means connecting the cylinder means with said pump, said piston means being so arranged that the operable piston faces are acted upon by fluid from said pump, piston rods to actuate said table so connected to each of the pistons and to the work-holding table that the fluid forces act to produce tension only in the piston rods, means to effect a reversal of fluid flow to said cylinder means, and means automatically functioning at the end of each table stroke to actuate said flow reversal means.

FRANK E. STRATTON.